United States Patent [19]

Schrader

[11] 4,093,109

[45] June 6, 1978

[54] EXPANSIBLE TROUGH APPARATUS FOR USE IN PRODUCING POLYURETHANE FOAM

[76] Inventor: Milford J. Schrader, 525 Cinderella Dr., Claremont, Calif. 91711

[21] Appl. No.: 725,108

[22] Filed: Sep. 20, 1976

[51] Int. Cl.² .................. B29D 27/00; B29D 27/04
[52] U.S. Cl. .................. 222/527; 425/4 C; 425/817 C
[58] Field of Search .......... 425/4 C, 817 C; 193/2 C; 222/460, 527

[56] References Cited

U.S. PATENT DOCUMENTS

| | | | |
|---|---|---|---|
| 1,212,524 | 1/1917 | Lucas | 193/2 C |
| 3,786,122 | 11/1974 | Berg | 425/4 C X |
| 3,870,441 | 3/1975 | Petzetakis | 425/4 C |
| 4,032,275 | 6/1977 | Schwab et al. | 425/817 C |

Primary Examiner—Allen N. Knowles
Assistant Examiner—David A. Scherbel
Attorney, Agent, or Firm—Lyon & Lyon

[57] ABSTRACT

Disclosed herein is a trough and fall plate particularly adapted for use in producing continuous buns of polyurethane foam which trough and plate are expansible relative to the transverse axis of the plate for forming buns of variable widths. The trough is comprised of a pair of open ended trough sections and detachable end portions, one of the sections being slidably mounted with the other for varying the length of the defined trough and correspondingly the width of the forming bun.

8 Claims, 4 Drawing Figures

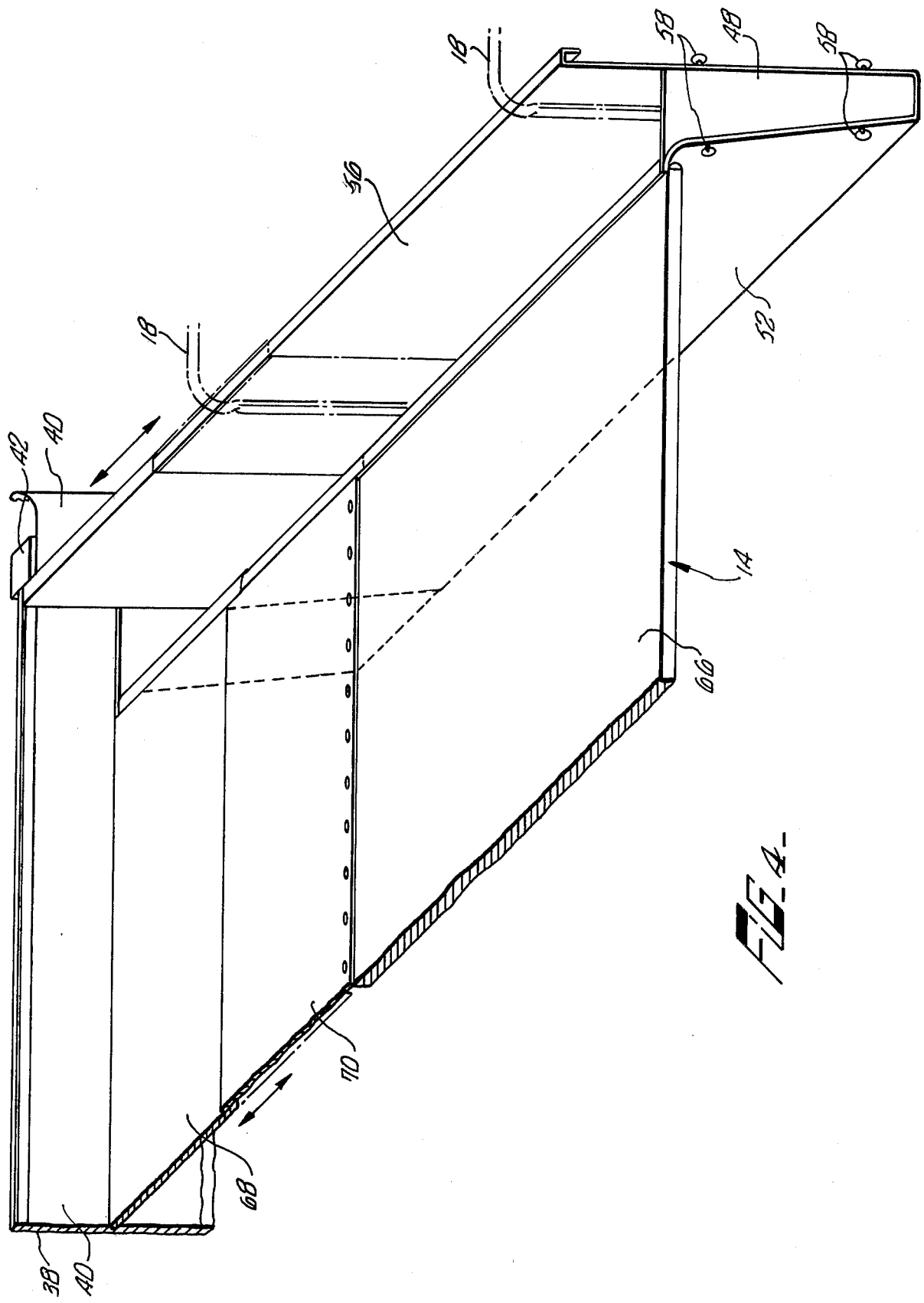

EXPANSIBLE TROUGH APPARATUS FOR USE IN PRODUCING POLYURETHANE FOAM

BACKGROUND OF THE INVENTION

This invention relates to the continuous production of polymeric foam slabs or buns, as they are commonly referred to in the art, and more particularly to an expansible trough and fall plate for use in such production by which the width of the forming bun can be varied to a desired length.

A method and related apparatus for producing continuous foam buns in which the trough and fall plate of the present invention to be used are disclsoed in United States Letters Pat. Nos. 3,786,122 and 3,832,099, which patents and all of the teachings therein are hereby incorporated by reference. Essentially, the method taught in those patents for continuously producing polymeric foam buns, or strands as they are referred to therein, comprises the steps of continuously supplying a mixture of liquid foam reactants to the bottom of a rigid vessel or trough, allowing the mixture to expand upwardly and foam in the vessel due to the chemical reaction between the reactants and, prior to the completion of this expansion, allowing the partially expanded foam to flow upwardly from the trough over a weir structure, down an inclined fall plate and onto a channel shaped conveyor in which the foam is continuously drawn away from the structure. As the foam expands and rises in the trough and passes over the weir, it changes from a generally liquid state to a generally solid state and on the conveyor solidifies into a generally flat bun of polyurethane foam.

While the aforesaid process has been found to be an improvement over the previous methods used for forming such buns, the improved process nevertheless had certain shortcomings. Most notably, the bun of polymeric foam produced by the process was always of the same width. If differently sized buns were desired, it was necessary to saw the bun to the desired width which not only consumed additional time and expense but often resulted in a waste of product. In addition, the vessel or trough in which the mixed chemicals are received was extremely difficult to clean after a run of a particular material due to the nature of the material involved, thereby further increasing the overall costs of production. It would be highly desirable to provide equipment which could be used in such a process which would be capable of producing buns of polymeric foam of different desired widths and which would alleviate the problem of cleaning heretofore experienced with the apparatus used in the process.

SUMMARY OF THE INVENTION

Briefly, the invention is comprised of an expansible trough adapted for use with an expansible fall plate in the continuous production of polyurethane foam buns. The trough is comprised of a pair of telescoping sections for varying the length of the trough and correspondingly adjusting the width of the forming bun. Similar adjustment is provided in the inclined fall plate for maintaining the forming bun in the proper width and detachable end portions are provided for the trough which allow the interior surface thereof to be fully covered with a protective paper lining to facilitate the cleaning operation.

It is therefore the principal object of the present invention to provide an apparatus for use in manufacturing continuous buns of polymeric foam in different widths.

It is another object of the present invention to provide an apparatus for use in manufacturing continuous buns of polymeric foam which greatly facilitates the cleaning operation following a production run.

These and other objects and advantages of the present invention will become apparent from the following detailed description taken in conjunction with the accompanying drawings.

IN THE DRAWINGS

FIG. 4 is a perspective view of the trough and expansible fall plate.

Figure 1:
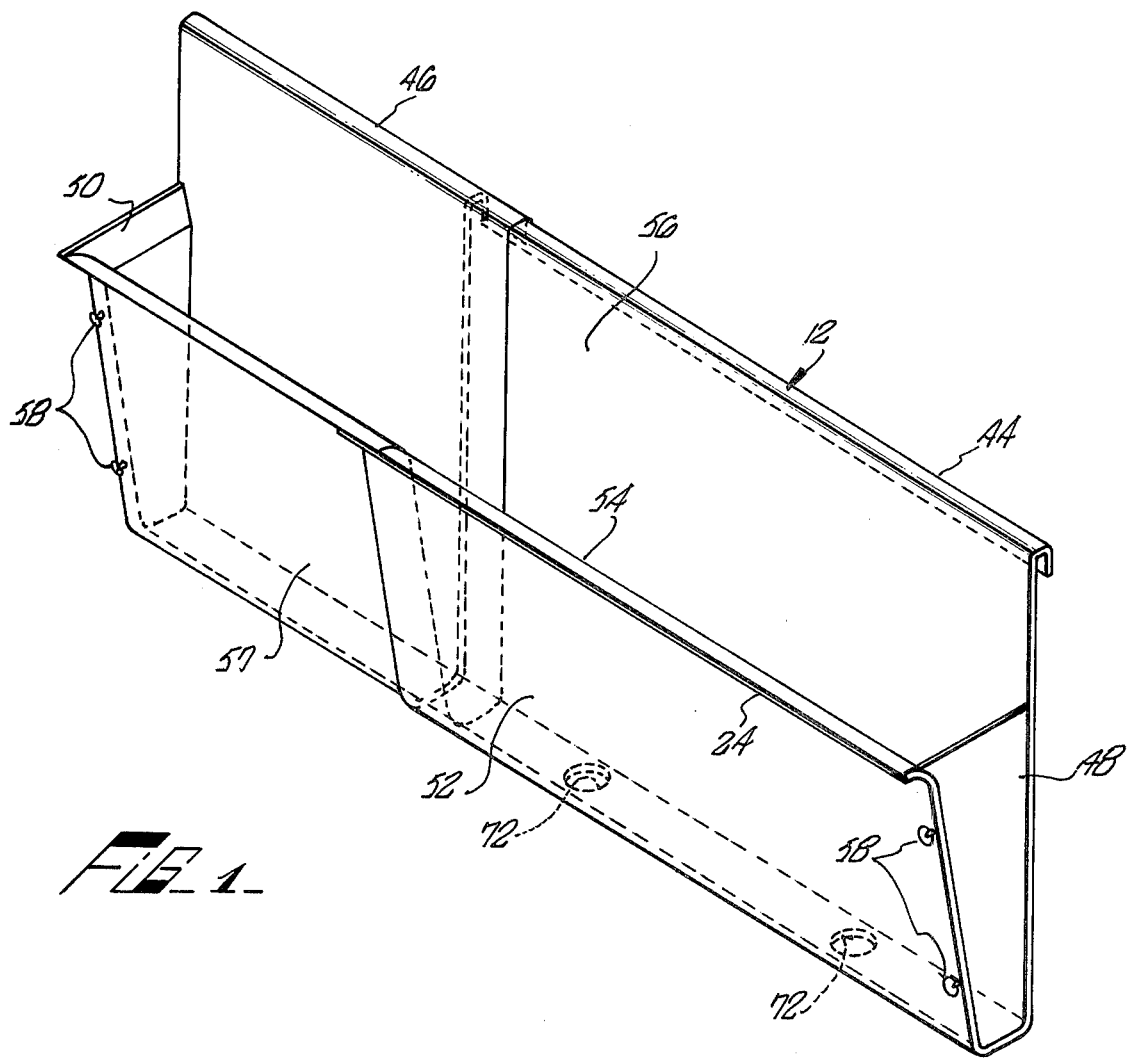
FIG. 1 is a perspective view of the expansible trough.
Figure 2:
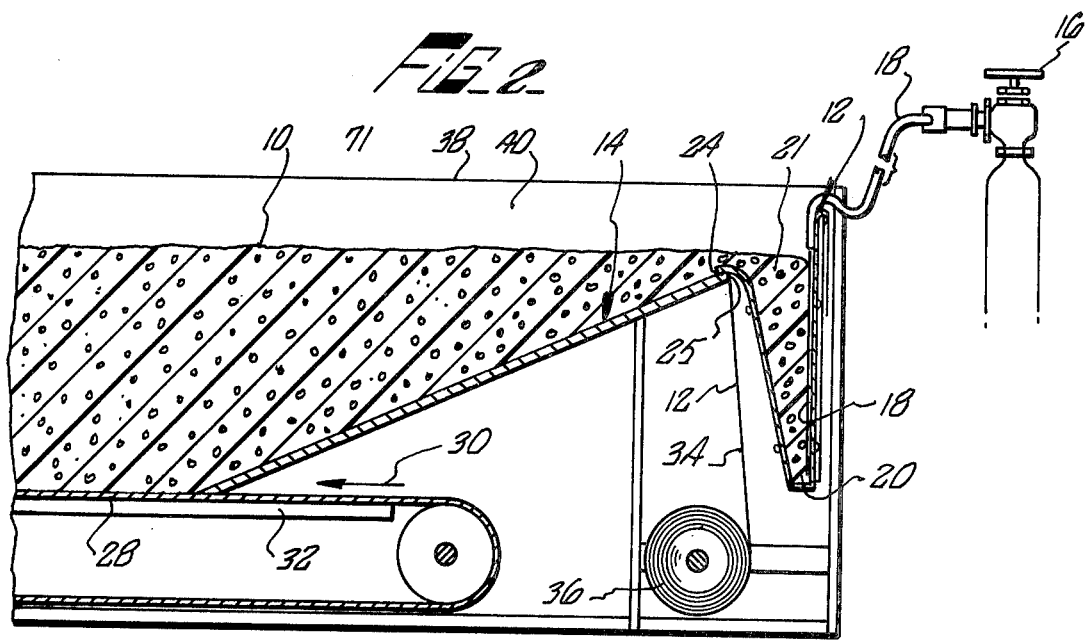
FIG. 2 is a diagramatic cross-section illustrating the apparatus for manufacturing continuous buns of polymeric foam including the trough of the present invention.

Referring now in detail to the drawings, FIG. 2 generally illustrates the apparatus for manufacturing a continuous bun 10 of polymeric foam which incorporates the expansible trough 12 and the fall plate 14 of the present invention. The apparatus also includes a mixing head 16, the output of which is directed by a pair of conduits 18 to a position near the bottom 20 of trough 12 through the open end 21 thereof. Adjacent the forward edge 24 of the trough, is the fall plate 14 which is inclined at an angle of about 20° with respect to the horizontal. This angle, as well-known in the art, varies with the particular material being used in a given run. A belt conveyor 28 is disposed under the downstream edge of the fall plate which moves in the direction of arrow 30 over a supporting platform 32. A sheet of protective material 34, for example, kraft paper, from a supply roll 36 passes upwardly in front of the trough 12, between the curved forward edge 24 thereof and rearward edge 25 of the fall plate 14 and over the inclined surface of the fall plate and onto the conveyor 28 to move therewith.

Adjacent each edge of the fall plate 14 is a rigid sidewall 38 which, together with the protective sheet 34, forms an open topped conveying system. As with sheet 34 and roll 36, a vertical sheet of similar protective material 40 is disposed along each of the sidewalls from the rolls (not shown) so as to separate the surface of the walls from the polymeric material to facilitate cleaning, as described in the aforesaid referenced patents. Sidewalls 38 are mounted on a frame (a portion of which is shown at 42 in FIG. 4) such that they are movable inwardly toward and in parallel alignment with the central axis of the inclined fall plate and conveyor 28 to cooperate with the expansible trough 12 and fall plate in the manner to be described.

The expansible trough 12 is comprised of a main and longer section 44, second section 46 and detachable end sections 48 and 50, each of which are preferably of single piece construction. The second section 46 of the trough fits tightly within the larger section but is slidable therein to define a trough which is expansible along its longitudinal axis, has a slightly inclined forward wall portion 52 terminating in a curved lip portion 54, which, in place, is disposed adjacent the rearward edge of the fall plate 14 as previously described, a rear wall portion 56 and bottom wall 57.

The detachable end sections each include extended contact surfaces 59 which mate with the corresponding wall portions of the trough sections adjacent the open ends thereof and are held thereagainst by thumb screws 58 or other suitable fastening means. Guide means 60 are provided on the contact surfaces 59 of the end sections which are received by guide holes 62 in the trough section to assist in properly aligning the end portions with the trough sections for securing the ends portions thereto upon the insertion of a protective liner as will be described.

Figure 3:
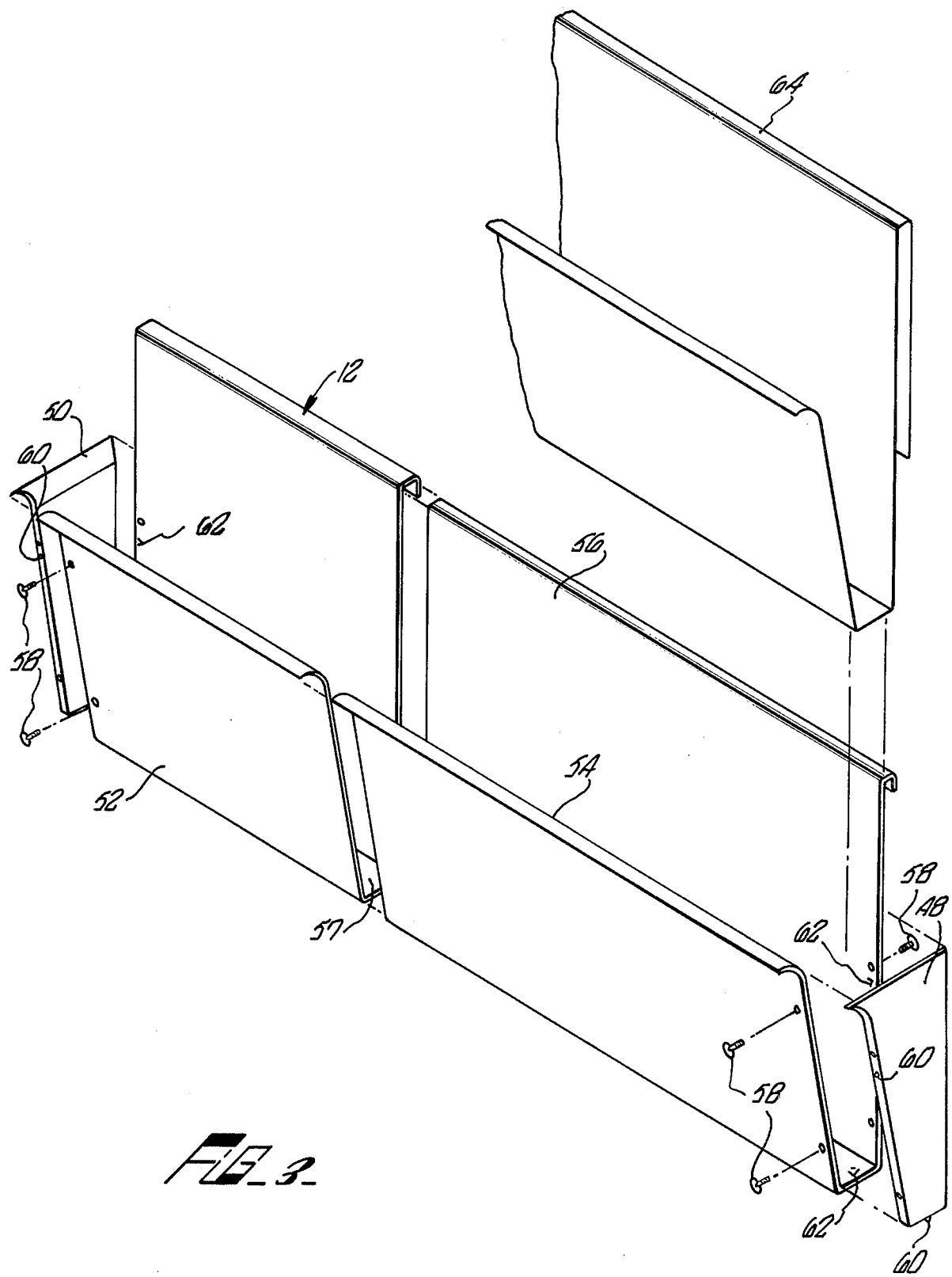
FIG. 3 is an exploded view of the expansible trough and paper liner.

To avoid having to remove the trough section from the complete assembly for a thorough cleaning after the completion of each run as is generally done when using the apparatus described in the aforementioned patents due to the difficulty encountered in accomplishing such a cleaning, a protective lining 64, again preferably constructed of paper, is employed. As illustrated in FIG. 3, the lining fits over the rear wall of the trough 12 and extends along and against the interior walls and bottom thereof. In inserting the lining, the end sections of the trough are removed and the protective lining disposed within the open ended trough with the lateral ends thereof extending beyond the open ends of the trough. The end sections of the trough are then secured to the trough sections with the aid of the guide means which have been found to be very helpful in aligning the thumb screw receiving apertures in the trough sections with the thumb screws. After securing the end sections to the trough, the excess material of the protective lining can be trimmed if desired. In this manner, all but the interior of the end portions of the trough are out of direct contact with the polymeric material.

To protect the end sections 48 and 50 from the foaming reactants to further alleviate the clean up problem, they can be given a teflon protective coating or, alternatively, tightly wrapped in a suitable protective plastic material such as that sold under the trademark Saran Wrap by the Dow Chemical Company. In this manner, the entire interior of the trough is out of direct contact with the foaming polymeric material and accordingly, a thorough cleaning can be accomplished by merely removing the lining from the interior of the trough and either removing the plastic covering from the end portions of the trough or simply rinsing the same when coated with teflon. It has been found impractical to provide a teflon coating to the interior of the entire trough due to the expenses involved in coating such a large area and the likelihood of damage to the coating.

FIG. 4 illustrates the expansible structure of the fall plate 14 achieved through a three piece construction comprised of a first lower section 66, a second lower section and preferably narrower section 68 and an upper section 70 disposed over the juncture of the first and second sections and secured thereto in a standard fashion such that the first and second lower sections can be slidably moved in a transverse direction with respect to the longitudinal axis of the upper section. By so moving the lower sections of the fall plate, the plate can be made to define a width or lateral dimension equal to the preset length of the trough.

In operation, the expansible trough 12 is first extended or compressed to a length which corresponds with the desired width of the polymeric bun to be produced. The protective liner 64 is then inserted into the trough such that it hugs the interior walls thereof and the end portions of the trough are secured. The fall plate is then correspondingly extended or compressed and the moveable sidewalls 38 moved to the edges of the fall plate. In so doing, the sidewalls move over the surface of the conveyor 28 and sheeting 34 which have a lateral dimension at least equal to the maximum extended width of the trough so that it can handle buns as wide as those which can be produced from the trough. In an alternate construction, a portion of the sidewalls 38 could be secured to the ends of the fall plate and would thereby be brought into proper position with the adjustment of the lateral dimension of the plate. Of course, the remaining portions of the sidewalls which would be disposed over the conveyor would then have to be brought in alignment with the walls carried by the fall plate. With these adjustments made and the mixing head 16 fed with chemical reactants suitable for producing polymeric foam, as known in the art, the mixture of reactants is fed through conduits 18 to the bottom of the trough as described above.

The mixture of reactants which begins in the mixing head 16 is essentially liquid as it arrives in the trough but, as the liquid level rises, the mixture begins to expand and foam, as is well-known, due to the chemical reaction. The expanding foam then rises upwardly in the trough, over the curved lip surface 54 thereof and into contact with the moving protective sheet 34 disposed over the fall plate 14. The foam then moves down over the fall plate and in so doing is changing from a mainly liquid to a largely solid state. As the foam expands and rises in the trough, fresh liquid mixture is supplied to the bottom of the trough so that a constant flow of solidifying foam passes over the forward edge of the trough and onto the fall plate.

As indicated in the referenced patents, the angle of inclination of the fall plate with the horizontal is chosen such that the foam, continuing to expand, retains a horizontal top surface 71. Generally, this angle is about 20° but varies with the type of foam being used. When the foam reaches the bottom of the fall plate, the expansion or foaming has substantially ceased and expanded foam continues horizontally along the conveyor while the foam curing occurs. The resulting bun can then be cut or sawed into desired lengths.

Upon completion of a run the mixing head is cleaned by running a cleaning agent of methylene chloride therethrough which flushes the heads and runs into the trough through the conduits 18 where it is mixed with the residue in the trough. To drain the resulting slurry from the trough, one or more apertures 72 are disposed in the bottom wall 57 of the trough. These apertures are covered by the protective lining 64 and thereby avoid any leakage during use, but allow the trough to be drained by merely punching corresponding holes in the protective lining over apertures 72 whereupon the slurry will drain from the trough. After the trough has been drained, the protective lining is merely removed from the trough. Little or no additional cleaning of the trough is required. Accordingly, the above described structure not only allows the described method to continuously produce buns of polymeric foam in different widths, but greatly reduces the amount of time necessary to clean the apparatus prior to the initiation of another run.

Various changes and modifications may be made in carrying out the present invention without departing from the spirit and scope thereof. Insofar as these changes and modifications are within the purview of the appended claims, they are to be considered as part of the invention.

I claim:

1. In an apparatus for use in the production of continuous buns of polymeric foam from a mixture of liquid foam reactants, an improvement comprising a pair of open ended trough sections, one of said sections being slidably mounted within the other to define an expansible trough, a pair of detachable end sections, one of said sections being disposed at the extended end of each of said trough sections, means for securing each of said end sections to said extended ends of said trough sections and a protective lining disposed along and against the interior of said trough sections to prevent contact between said sections and said liquid foam reactants, lateral portions of said lining being disposed between and held by said trough sections and said end sections.

2. The combination of claim 1 including an inclined fall plate extending downwardly from said trough, said fall plate being correspondingly expansible with said trough in a transverse direction to the longitudinal axis of said plate, and a pair of vertical sidewalls disposed adjacent the transverse ends of said plate, said walls being continually parallel with and correspondingly moveable with said end of said plate.

3. In an apparatus for use in the production of continuous buns of polymeric foam from a mixture of liquid foam reactants, an improvement comprising a pair of open ended trough sections, one of said sections being slidably mounted within the other to define an expansible trough, a pair of detachable end sections, one of said sections being disposed at the extended end of each of said trough sections and each of said end sections having a flat contact surface corresponding in configuration to and being adapted to mate with the interior surface of said trough sections adjacent the open ends thereof, a protective lining disposed along and against the interior of said trough to prevent contact between said sections and said liquid foaming reactants, lateral portions of said lining being disposed between said trough sections and said contact surfaces of said end sections, and means for drawing said end sections to said trough sections such that said lining is tightly held between said trough sections and said end sections.

4. The combination of claim 3 including guide means carried by said end sections and said trough sections, said means carried by said end sections cooperating with said means carried by said trough sections for aligning said end sections with said trough sections.

5. The combination of claim 3 including an inclined fall plate extending downwardly from said trough, said fall plate being correspondingly expansible with said trough in a transverse direction to the longitudinal axis of said plate and a pair of vertical sidewalls disposed adjacent the transverse ends of said plate, said walls being continually parallel with and correspondingly moveable with said end of said plate.

6. An expansible trough particularly adapted for use in the production of continuous buns of polymeric foam from a mixture of liquid foam reactants, said trough comprising a pair of trough sections, each of said sections defining a forward wall portion, a rearward wall portion and a bottom wall portion extending therebetween, one of said sections being slidably mounted within the other of said sections to define an expansible trough, a pair of detachable end sections, one of said sections being disposed at the extended end of each of said trough sections and each of said end sections defining flat contact surfaces adapted to mate with said wall portions of said trough sections adjacent the extended open ends thereof such that a protective lining for the interior of said trough sections can be held therebetween, means for drawing said contact surfaces of said end sections to said walls of said trough sections thereby securing said end sections to said trough sections and guide means carried by said end sections and said trough sections, said means carried by said end sections cooperating with said means carried by said trough sections for aligning said end sections with said trough sections.

7. The combination of claim 6 including a protective lining disposed along and against the interior walls of said trough sections to prevent contact between said sections and said liquid foam reactants, lateral portions of said lining being disposed between and held by said cross-sections and said contact surfaces of said end sections.

8. In an apparatus for use in the production of continuous buns of polymeric foam from a mixture of liquid foam reactants, an improvement comprising a pair of open ended trough sections, one of said sections being slidably mounted within the other to define an expansible trough, a pair of detachable end sections, one of said sections being disposed at the extended end of each of said trough sections, means for securing each of said end sections to said extended ends of said trough sections, guide means carried by said end sections and said trough sections, said means carried by said end sections cooperating with said means carried by said trough sections for aligning said end sections with said trough sections and a protective lining disposed within the interior of said trough sections to prevent contact between said trough sections and said liquid foam reactants.

* * * * *